(12) United States Patent
Kanba et al.

(10) Patent No.: US 7,740,971 B2
(45) Date of Patent: Jun. 22, 2010

(54) SEPARATOR FOR FUEL CELL AND PRODUCTION PROCESS FOR THE SAME

(75) Inventors: Noboru Kanba, Fujioka (JP); Yoshihisa Suda, Fujioka (JP)

(73) Assignee: Mitsubishi Pencil Co., Ltd., Shinagawa-Ku, Tokyo (JP)

( * ) Notice: Subject to any disclaimer, the term of this patent is extended or adjusted under 35 U.S.C. 154(b) by 328 days.

(21) Appl. No.: 11/989,958

(22) PCT Filed: Aug. 7, 2006

(86) PCT No.: PCT/JP2006/315609
§ 371 (c)(1),
(2), (4) Date: Feb. 4, 2008

(87) PCT Pub. No.: WO2007/018185
PCT Pub. Date: Feb. 15, 2007

(65) Prior Publication Data
US 2010/0099000 A1    Apr. 22, 2010

(30) Foreign Application Priority Data
Aug. 5, 2005   (JP) .............................. 2005-227822

(51) Int. Cl.
*H01M 8/02*   (2006.01)
*H01M 8/10*   (2006.01)

(52) U.S. Cl. .............................. 429/34; 429/38; 429/39; 427/508

(58) Field of Classification Search ........................ None
See application file for complete search history.

(56) References Cited

U.S. PATENT DOCUMENTS

| 2002/0160248 A1 | 10/2002 | Takao et al. |
| 2005/0037253 A1* | 2/2005 | Faghri .......................... 429/34 |
| 2005/0130022 A1 | 6/2005 | Tanno et al. |
| 2005/0287415 A1 | 12/2005 | Hatoh et al. |

FOREIGN PATENT DOCUMENTS

| EP | 0975040 A1 | 1/2000 |
| JP | 2001-283873 A | 10/2001 |
| JP | 2002-25570 A | 1/2002 |
| JP | 2003-223904 A | 8/2003 |

(Continued)

OTHER PUBLICATIONS

International Search Report (PCT/ISA/210), (Oct. 2006).

(Continued)

*Primary Examiner*—John S Maples
(74) *Attorney, Agent, or Firm*—Buchanan Ingersoll & Rooney PC

(57) ABSTRACT

In order to provide a separator for a fuel cell which is improved in cell characteristics by controlling a wetting property of the separator for a fuel cell and a production process for the same, assumed is a constitution in which in a separator A for a fuel cell molded from at least from a carbon material, a hydrophilic functional group is formed and increased on a surface part of a flow passage surface 11 in the separator 10 by irradiation treatment of a YAG laser apparatus 20 and in which an uneven part having an average surface roughness Ra of less than 50 μm is formed.

13 Claims, 5 Drawing Sheets

FOREIGN PATENT DOCUMENTS

| | | |
|---|---|---|
| JP | 2004-335121 A | 11/2004 |
| JP | 2005-5088 A | 1/2005 |
| JP | 2005-197222 | 7/2005 |
| JP | 2003-19252 A | 1/2006 |
| JP | 2006-066138 | 3/2006 |
| KR | 2003-030269 * | 4/2003 |

OTHER PUBLICATIONS

International Preliminary Report on Patentability with Written Opinion of the International Searching Authority, International Application No. PCT/JP20069/315609, dated Feb. 14, 2008.

* cited by examiner

SEPARATOR FOR FUEL CELL AND PRODUCTION PROCESS FOR THE SAME

This application is a national stage entry of PCT/JP2006/315609, filed 7 Aug. 2006, which application claims priority of Japanese 2005-227822, filed 5 Aug. 2005.

TECHNICAL FIELD

The present invention relates to a separator for a fuel cell which is suited to polymer electrolyte fuel cells and the like and a production process for the same, more specifically to a separator for a fuel cell which is improved in cell characteristics by controlling a wetting property and a production process for the same.

BACKGROUND ART

A fuel cell is highly expected as energy for the next generation which is clean and can exhibit a high power generation efficiency, and particularly in recent years, a polymer electrolyte fuel cell attracts attention because of the advantages that a high output power is obtained and that an operating temperature range is relatively low.

The above polymer electrolyte fuel cell is usually constituted from a stack in which a unit cell is laminated, comprising a polymer electrolyte membrane comprising an ion-exchange membrane, two electrodes provided at both sides of the polymer electrolyte and a separator provided therein with gas-feeding grooves for feeding a fuel gas such as hydrogen or an oxidizing gas such as oxygen to the respective electrodes and two power collectors provided at the outsides of the stack.

In the above fuel cell, a high output power can be generated, though an operating temperature is as low as 80 to 100° C., since a polymer electrolyte membrane having a high performance is used at an electrolyte part.

High gas impermeability is required to the separator of the above polymer electrolyte fuel cell in order to feed a fuel gas and an oxidizing gas to the electrodes in a completely separated state. Also, an internal resistance of the cell has to be reduced in order to enhance the power generation efficiency, and therefore the separator has to have the high electrical conductivity. Further, excellent corrosion resistance, chemical resistance, mechanical strength and hydrophilicity have to be endowed in order to secure long term durability and high thermal conductivity for efficiently releasing heat generated as cell reaction proceeds to uniformize temperature distribution in the cell.

Among the above characteristics required, a performance of making it possible to quickly discharge water produced in power generation, that is, the presence of hydrophilicity in the separator is one of the most important characteristics required.

Many arts have so far been known as art for enhancing hydrophilicity of a separator for a fuel cell, and known are, for example, (1) a separator for a polymer electrolyte fuel cell which is prepared by subjecting conductive carbon having a hydrophilic functional group on at least a part of a surface and a binder to molding by pressing or hot molding by pressing and in which irregularities of average 50 µm or more and 1 mm or less are provided on a surface of a gas passage by sand blast processing (refer to, for example, patent document 1), (2) hydrophilicity treatment of a separator for a fuel cell characterized by subjecting the separator for a fuel cell to atmospheric discharge plasma treatment (refer to, for example, patent document 2) and (3) a separator for a fuel cell which is prepared by molding a composition comprising a thermosetting resin, artificial graphite having an average particle diameter of 20 to 70 µm and an internal mold releasing agent and which is provided with an average surface roughness Ra of 1.0 to 5.0 µm produced by a surface treatment method such as a shot blast method and the like (refer to, for example, patent document 3).

However, the separators for a fuel cell in which uneven parts are formed by the sand blast processing, the atmospheric discharge plasma treatment and the shot blast method each described in the patent documents 1 to 3 described above involve the problem that since the uneven parts are formed on the surface of the gas passage, parts other than the uneven parts have to be masked so that the surface treating step is complicated and the problem that the uneven parts are not accurately formed so that the yield is lowered. Further, involved therein is the problem that the hydrophilic performance is still reduced with the passage of time in the above surface treatments.

Further, in the separator for a fuel cell described in the patent document 1 described above, the carbon particles are subjected to treatment for providing with a hydrophilic functional group and then subjected together with a binder to molding by pressing or hot molding by pressing, and after molding, treatment in which the uneven parts are formed on the surface of the gas passage is carried out, so that brought about are the problems that the production efficiency is inferior and that dispersion in the performance is caused.

In the separator for a fuel cell described in the patent document 2 described above in which the plasma treatment is carried out, various treating gases are essentially required, and further there is the restriction that the treatment has to be carried out in atmosphere in which the gas is diluted by an inert gas from a safety point of view. Further, the excited gas is blown and brought into contact with the separator for a fuel cell to carry out treatment, and therefore the problem that it is difficult to carry out partial processing to form complicated and fine groove patterns is involved therein. Also, there is the problem that the wetting property is reduced with the passage of long time in a dry state. Further, the separator for a fuel cell described in the patent document 3 described above is prepared by molding a composition comprising a thermosetting resin, an artificial graphite having an average particle diameter of 20 to 70 µm and an internal mold releasing agent, and involved therein are the problem that the internal mold releasing agent added bleeds out with the passage of time and the problem that the wetting property is not satisfactory due to the composition blended with the resin and the mold releasing agent and that the wetting property is reduced with the passage of time.

On the other hand, known as art in which laser treatment is used for producing a fuel cell are, for example, a production process for a fuel cell in which an MEA is constituted by a polymer electrolyte membrane and a fuel electrode and an air electrode each provided at both sides of the electrolyte membrane and in which both sides of the MEA are interposed by separators to laminate a single cell stack, wherein the separator is molded integrally a mixture of graphite particles and a resin to provide with a gas passage on the surface, and then a skin layer formed on the separator is removed by carbonizing the skin layer having a large resin content by laser irradiation (refer to, for example, patent document 4). Further, known is a production process of an electrolyte membrane for a fuel cell comprising (a) a step for forming a substrate from hydrogen-permeable metal and (b) a step for forming a ceramic layer having proton conductivity on the surface of the substrate described above, wherein in the above step (b), crystallization energy required for crystallizing an amorphous material which forms the ceramic layer described above is supplied locally on the amorphous material by laser irradiation (refer to, for example, patent document 5).

However, in the art described in the patent document 4 described above, the groove part is masked, and the surface of the separator having a large resin content other than the groove part is carbonized to reduce the contact electric resistance. It is not perceived at all to subject the groove part to hydrophilization treatment by laser irradiation, and the above art is completely different from the present invention in an object and a technical concept (constitution and action effect). In addition thereto, a dose of the laser irradiation for carrying out the above carbonization is too large to achieve the hydrophilization treatment by the dose concerned.

Further, the art described in the patent document 5 described above is a production process of an electrolyte membrane for a fuel cell, and it is not perceived at all to carry out hydrophilization by laser irradiation, so that the above art is completely different from the present invention in an object and a technical concept (constitution and action effect).

Patent document 1: Japanese Patent Application Laid-Open No. 283873/2001 (claims, examples and others)

Patent document 2: Japanese Patent Application Laid-Open No. 25570/2002 (claims, examples and others)

Patent document 3: Japanese Patent Application Laid-Open No. 197222/2005 (claims, examples and others)

Patent document 4: Japanese Patent Application Laid-Open No. 335121/2004 (claims, examples and others)

Patent document 5: Japanese Patent Application Laid-Open No. 5088/2005 (claims, examples and others)

DISCLOSURE OF THE INVENTION

Problems to be Solved by the Invention

In light of the conventional problems described above and the like, the present invention has been made in order to solve them, and an object thereof is to provide a separator for a fuel cell which exhibits excellent hydrophilicity regardless of the passage of time without carrying out specific pre-treatment and which can enhance the characteristics of the cell and a production process for the same.

Means for Solving the Problems

Intensive investigations on the conventional problems described above repeated by the present inventors have resulted in finding that a separator for a fuel cell which meets the object described above and a production process for the same are obtained by forming a hydrophilic functional group on a surface part of a separator for a fuel cell molded at least from a carbon material by subjecting it to specific treatment and forming an uneven part in which an average surface roughness Ra is less than a specific value, and thus the present invention has come to be completed.

That is, the present invention comprises the following items (1) to (8).

(1) A separator for a fuel cell molded from at least a carbon material, wherein a hydrophilic functional group is formed and increased on a surface part of the separator by laser irradiation treatment, and an uneven part having an average surface roughness Ra of less than 50 μm is formed.

(2) The separator for a fuel cell as described in the above item (1), wherein a part treated with a laser on the surface of the separator for a fuel cell is at least a part or a whole part of a flow passage surface.

(3) The separator for a fuel cell as described in the above item (1) or (2), wherein the separator for a fuel cell comprises any one of a molded article of a composite of a thermosetting resin or a thermoplastic resin and carbon, an expanded graphite molded article, a vitreous carbon molded article and a molded article of a composite of vitreous carbon and graphite.

(4) The separator for a fuel cell as described in any one of the above items (1) to (3), wherein the laser irradiation treatment is carried out in gas atmosphere containing at least oxygen.

(5) The separator for a fuel cell as described in any one of the above items (1) to (3), wherein the hydrophilic functional group is at least one of —OH, —COOH and >C=O.

(6) The separator for a fuel cell as described in any one of the above items (1) to (5), wherein the uneven part has an average surface roughness Ra of less than 30 μm.

(7) The separator for a fuel cell as described in any one of the above items (1) to (6), wherein the surface of the separator for a fuel cell treated by laser irradiation comprises a continuous and smooth curved surface.

(8) A production process of a separator for a fuel cell comprising:

forming and increasing a hydrophilic functional group on a surface part of a separator for a fuel cell molded from at least a carbon material by subjecting the surface of the separator to laser irradiation treatment and forming an uneven part having an average surface roughness Ra of less than 50 μm.

The "average surface roughness Ra" prescribed in the present invention is a value measured by a method prescribed in JIS B0601-1994.

The "continuous and smooth curved surface" prescribed in the present invention means a state in which a material a surface of which is molten and liquefied by carrying out laser treatment is solidified as it is and such a solidified surface is continuously and smoothly spread over the whole part. This is clearly observed under an electron microscope at a magnification of 10000 times. In a stage before the laser treatment, the surface stays in a discontinuous state due to agnail and burr which are partially produced on the surface at a step of molding or calcining, clear boundaries and defects brought about by edges of an extender material such as graphite. Further, the discontinuous surface state becomes more discontinuous by plasma treatment and oxidation treatment.

Effects of the Invention

According to the present invention, provided is a separator for a fuel cell which is provided with excellent hydrophilicity without carrying out specific pre-treatment and which enhances the characteristics of the cell.

According to the present invention, provided is a production process of a separator for a fuel cell capable of producing a separator for a fuel cell which is provided with excellent hydrophilicity without carrying out specific pre-treatment and which is inexpensive and mass-productive.

LIST OF REFERENCE NUMERALS

Figure 1:
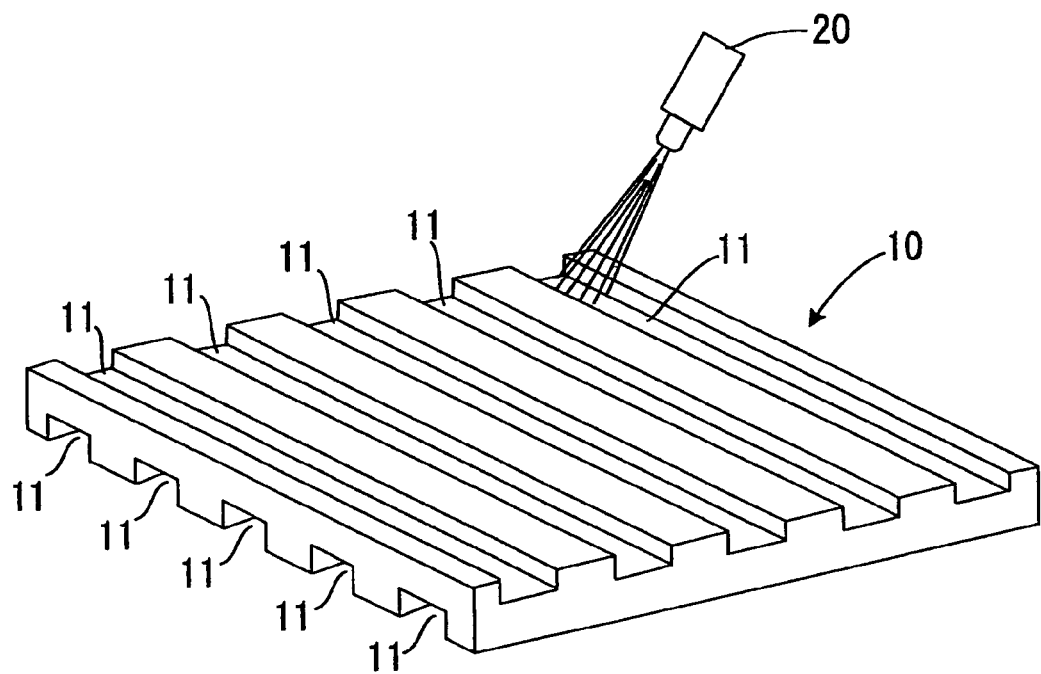
FIG. 1 shows one example of the present invention and is an outline explanatory drawing showing one example of a state in which a prescribed surface part (flow passage surface) of the separator for a fuel cell is subjected to laser irradiation treatment.

A Separator for a fuel cell
10 Separator
11 Flow passage surface (groove part)
12 Uneven part
20 Laser apparatus

BEST MODE FOR CARRYING OUT THE INVENTION

The embodiments of the present invention shall be explained below in details.

The separator of the present invention for a fuel cell is a separator for a fuel cell molded from at least a carbon material, wherein a hydrophilic functional group is formed and increased on a surface part of the separator by laser irradiation treatment, and an uneven part having an average surface roughness Ra of less than 50 μm is formed.

The production process of a separator for a fuel cell according to the present invention is characterized by comprising:

forming and increasing a hydrophilic functional group on a surface part of a separator for a fuel cell molded from at least a carbon material by subjecting the surface to laser irradiation treatment and forming an uneven part having an average surface roughness Ra of less than 50 μm.

The "present invention" referred to in the following descriptions include both of the separator for a fuel cell and the production process for the same.

In the present invention, a method for preparing a composition containing the carbon material, the molding method, the shape and the structure shall not specifically be restricted as long as the separator for a fuel cell before subjected to the laser irradiation treatment is a separator for a fuel cell molded from at least a carbon material, and it includes, for example, a separator for a fuel cell prepared by forming a groove part which is a prescribed flow passage from at least a carbon material by using a mold and then forming a prescribed structure by calcining treatment, a separator for a fuel cell prepared by forming a groove part which is a prescribed flow passage surface from at least a carbon material and a thermosetting resin or a thermoplastic resin by using a mold and a separator for a fuel cell prepared by forming a groove part which is a prescribed flow passage surface from at least a thermosetting resin by using a mold and then forming a prescribed structure by calcining treatment.

Raw materials used for the separator include, in addition to the carbon material, a thermosetting resin, a thermoplastic resin and a mixed material thereof and respective additives for molding separators such as a curing accelerator, a plasticizer, a solvent and the like.

The carbon material which can be used shall not specifically be restricted and includes, for example, vitreous carbon, isotropic carbon materials, graphite powder (including high oriented pyrolytic graphite (HOPG), kish graphite, natural graphite, artificial graphite, fullerene and carbon black), carbon fibers (including vapor growth carbon fibers, PAN carbon fibers and graphite carbon fibers), carbon nanotubes, expanded graphite sheets and the like. The above carbon materials are suitably selected according to the electric conductivity value required and the like, and they can be used alone or in a mixture of two or more kinds thereof. In particular, the carbon materials having a high conductivity-improving effect are preferred.

The binder or the thermosetting resin used for binding the carbon material includes, for example, phenol resins, polyimide resins, furan resins, epoxy resins, xylene resins, unsaturated polyester resins, melamine resins, alkyd resins, COPNA resins and the like, and the resins which are three-dimensionally cured by producing intermolecular cross-linkage with heating and which exhibit a high yield of carbon residue without carrying out specific treatment to make a carbon precursor.

The thermoplastic resin includes, for example, vinyl chloride-vinyl acetate copolymers, polyvinyl chloride, polyacrylonitrile, polyvinyl alcohol, polyamide and the like.

In the present invention, considering gas impermeability, electrical conductivity, thermal conductivity, corrosion resistance, chemical resistance, mechanical strength and the like which are required to the separator for a fuel cell, various sorts of the respective raw materials described above are preferably selected to use a mixture (composition) comprising suitable blending amounts. It includes, for example, a mixture comprising the carbon material, the binder and the curing accelerator, a mixture comprising the carbon material and the thermosetting resin and a mixture comprising the carbon material, the thermoplastic resin and the plasticizer.

The mixture obtained above is filled in an amount suited to a mold of a groove pattern which is a flow passage surface and molded (molding step). A shape (a V shape, a concave shape and the like in a cross section), a depth, a width and a pattern of the groove in the mold shall not specifically be restricted, and they are suitably set to the suited shape, depth, width and pattern of the groove according to the kind, the uses and the structure of the fuel cell.

For example, when producing the separator by calcining treatment, the mold filled with the mixture described above is heated to 70 to 150° C. to carry out solidifying treatment (drying step), and the resin plate obtained is released from the mold. Further, it is calcined by heating treatment under non-oxidative atmosphere (calcining treatment), whereby the separator having a prescribed structure is obtained.

Calcination under non-oxidative atmosphere is carried out under at least one of inert gas atmosphere of nitrogen gas, argon gas or the like and vacuum, that is, under each single atmosphere or at two steps or three steps of the respective atmospheres, whereby the binder and the like are carbonized to prepare the separator having a prescribed structure. Minimum processing treatment such as processing a peripheral part for positioning for laminate a stack, punching processing and processing grooves in parts which are different on front and back surfaces for final finishing can be carried out as well, if necessary, after molding (step) and calcining (step) described above.

In the present invention, in the separator molded, as described above, from at least the carbon material, for example, the separator comprising any one of a molded article of a composite of a thermosetting resin or a thermoplastic resin and carbon (material), an expanded graphite molded article, a vitreous carbon molded article and a molded article of a composite of vitreous carbon and graphite, a hydrophilic functional group is formed and increased on a prescribed surface part to be hydrophilized, for example, a surface part which is a flow passage surface by laser irradiation treatment, and an uneven part having a surface roughness Ra of less than 50 μm is formed.

The laser irradiation treatment used shall not specifically be restricted as long as it is laser irradiation which can form and increase a hydrophilic functional group on a prescribed surface part of the separator, for example, at least on a part or a whole part of the flow passage surface and which can form the uneven part having a surface roughness Ra of less than 50 μm. It includes, for example, a YAG laser, a carbon dioxide gas laser, an excimer laser, an argon laser, a ruby laser, a glass laser and the like. The YAG laser is preferred from the viewpoints of an oscillation wavelength and general use.

The laser irradiation treatment in the present invention is carried out preferably at room temperature (25° C.) under air atmosphere or gas atmosphere containing at least oxygen from the viewpoints of efficiently forming and increasing at least one hydrophilic functional group selected from —OH, —COOH, >C=O and the like on a prescribed surface part of the separator, for example, at least a part or a whole part of the flow passage surface and the economical efficiency. Further, it may be carried out as well at room temperature or higher in a humidified state.

The laser irradiation treatment in the present invention forms and increases, as described above, the hydrophilic functional group on the prescribed surface part of the separator and in addition thereto, forms the uneven part having an average surface roughness Ra of less than 50 μm. The uneven part having an average surface roughness Ra of preferably less than 30 μm, more preferably 0.01 to 10 μm and particularly preferably 0.2 to 7 μm is preferably formed.

Further, the uneven part formed by the laser irradiation treatment in the present invention has preferably an average surface roughness Ra of less than 50 μm as described above and comprises preferably a continuous and smooth curved surface.

If the above uneven part has an average surface roughness Ra exceeding 50 μm, the demerit that the output power fluctuates and becomes instable is brought about in the case of a small-sized machine such as DMFC since dimensional accuracy is important. Further, a fuel which flows through the flow passage suffers flow resistance, and therefore it is not preferred. If the uneven part has an average surface roughness Ra of less than 1 μm, the degree of hydrophilicity is low, and the targeted function of hydrophilicity can not be exhibited with the passage of time in a certain case.

In the present invention, the laser irradiation conditions shall not specifically be restricted as long as the dose is enough to form and increase the hydrophilic functional group on the prescribed surface part of the separator, for example, at least a part or a whole part of the flow passage surface and to form the uneven part having an average surface roughness Ra of less than 50 μm, and it is varied depending on the kind of raw material of the separator and a size and a shape thereof. When using a YAG laser, some of condition control such as control of output between 3 to 15 W, control of a laser scanning speed, control of a laser pulse duration, control of a laser spot diameter or an energy density (about $10^3$ to $10^6$ W/cm$^2$) by a focal distance, control of a laser irradiation pattern and the like is carried out, whereby the targeted hydrophilic functional group can be formed and increased, and the uneven part having an average surface roughness Ra of less than 50 μm can be formed. Further, suited combination of the respective condition control described above makes it possible to form the continuous and smooth curved surface.

As for the control of output between 3 to 15 W described above, though varied depending on the specifications and the irradiation conditions of the laser, the output power of less than 3 W makes it difficult to form and increase the hydrophilic functional group or extends time required for the treatment, and the hydrophilic functional group can not be fixed with the passage of time in a certain case. On the other hand, if the irradiation is carried out by an output power of exceeding 15 W, the dose is too large to result in cutting deeply the irradiated part, and therefore it becomes impossible to form and increase the targeted hydrophilic functional group and to form the uneven part. In addition thereto, the problem of a dimensional accuracy of the separator surface or the flow passage surface is brought about, and the performances of the fuel cell become instable.

Figure 2:
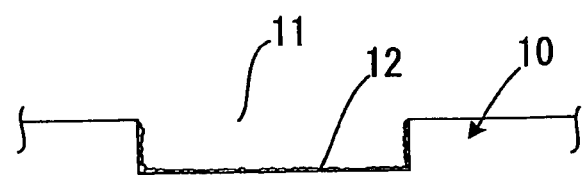
FIG. 2 shows one example of the present invention and is an enlarged outline cross-sectional drawing showing a state in which a hydrophilic functional group and an uneven part having an average surface roughness Ra of less than 50 μm are formed on a prescribed surface part (flow passage surface) of the separator for a fuel cell.
Figure 3:
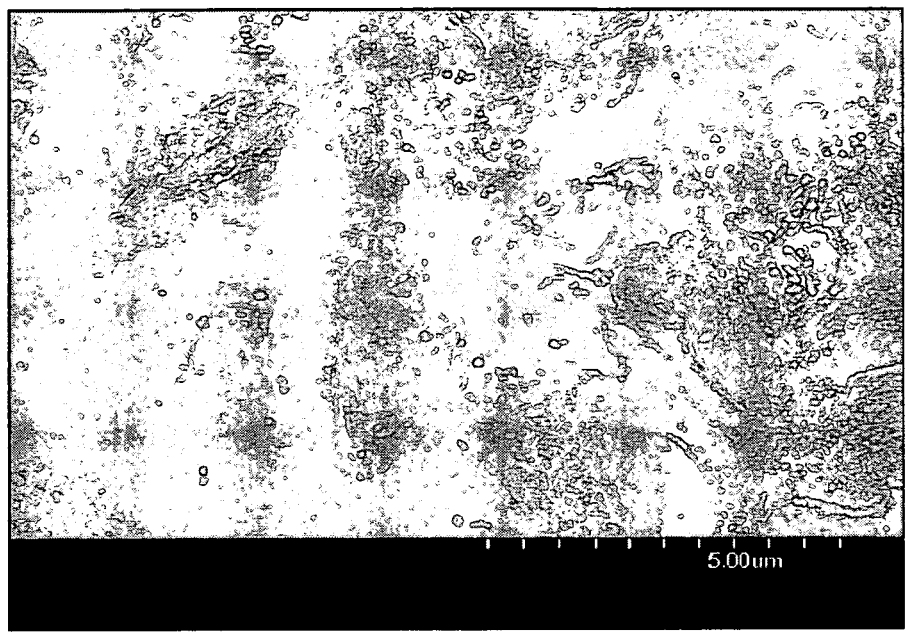
FIG. 3 is an electron micrograph of the separator surface (flow passage surface) of the present invention after subjected to the laser irradiation treatment.

FIG. 1 is an outline explanatory drawing showing one example of a state in which a prescribed surface part (flow passage surface) of the separator for a fuel cell is subjected to laser irradiation treatment. FIG. 2 is an enlarged outline cross-sectional drawing showing a state in which a hydrophilic functional group (—OH, —COOH, >C=O and the like) is formed and increased and in which an uneven part having an average surface roughness Ra of less than 50 μm is formed on a prescribed surface part (flow passage surface) of the separator. FIG. 3 is an electron micrographic drawing (S4700, magnification: 10,000 times, manufactured by Hitachi, Ltd.; hereinafter the same shall apply) of a continuous and smooth curved surface in the part of the reference number 12 (flow passage surface) shown in FIG. 2.

Figure 4:
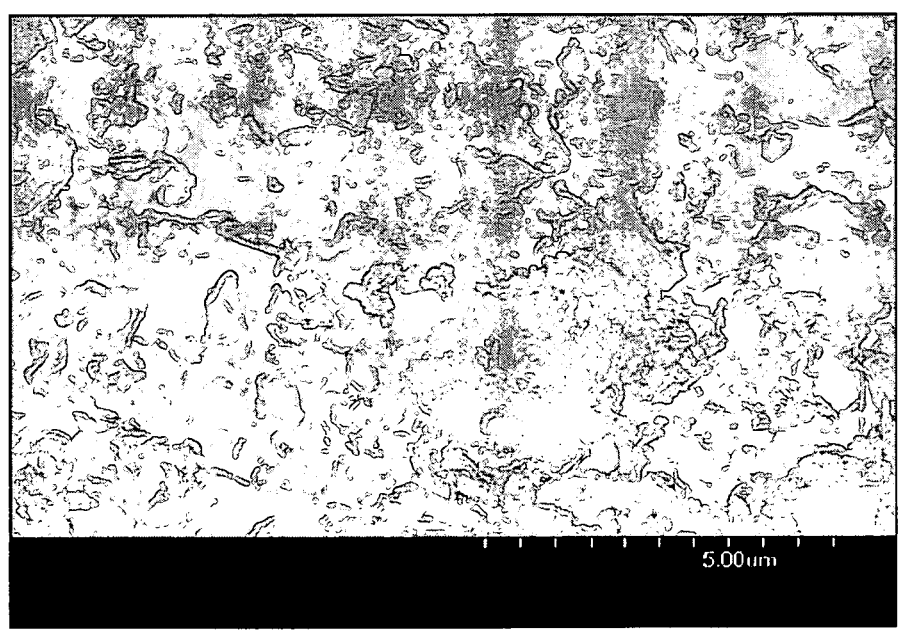
FIG. 4 is an electron micrograph showing one example of the separator surface (flow passage surface) which is a discontinuous treated surface.
Figure 5:
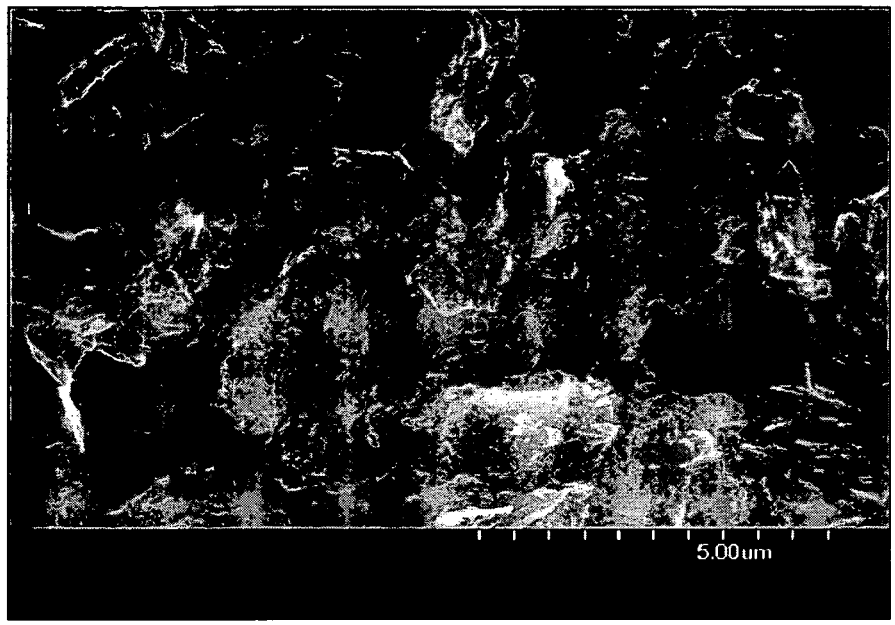
FIG. 5 is an electron micrograph showing a different example of the separator surface (flow passage surface) which is a discontinuous treated surface.
Figure 6:
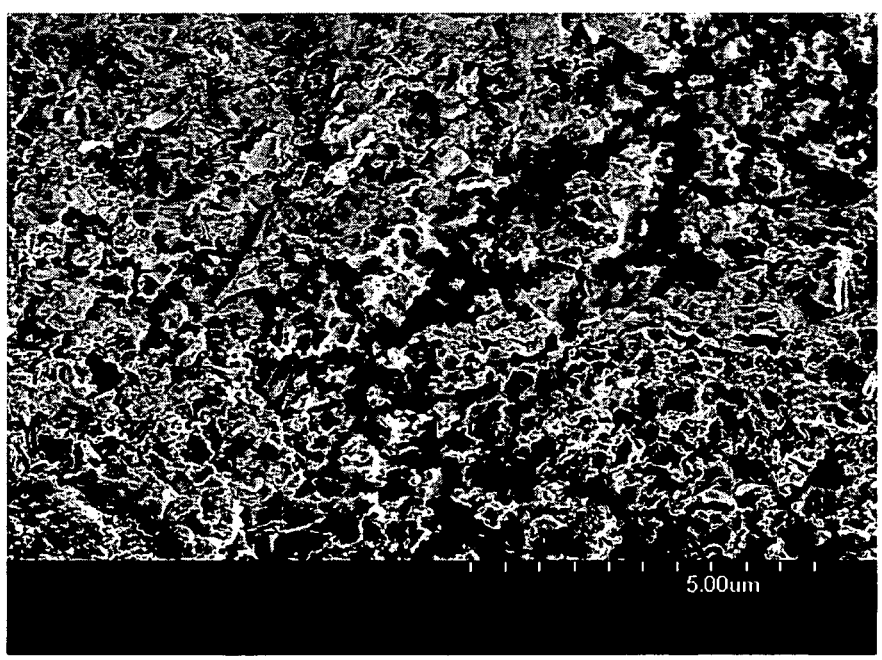
FIG. 6 is an electron micrograph showing a further different example of the separator surface (flow passage surface) which is a discontinuous treated surface.

FIG. 4 to FIG. 6 are electron micrographic drawings showing a discontinuous state in which the separator surface does not assume a continuous and smooth curved surface due to non-treatment and oxidation treatment, and FIG. 5 shows more discontinuous surface state than in FIG. 4.

In the present invention, a prescribed surface part (flow passage surface) 11 of the separator 10 for a fuel cell molded from at least a carbon material is subjected, as shown in FIG. 1, to irradiation treatment by a YAG laser apparatus 20, whereby formation and increase of the hydrophilic functional group (—OH, —COOH, >C=O and the like) and formation of the uneven part 12 having an average roughness Ra of less than 50 μm can be carried out at one time on the above surface part 11 in one step. Accordingly, the production efficiency thereof is better than in forming the uneven part by sand blast processing, atmospheric discharge plasma processing and shot blast processing in conventional masking treatment, and the treatment can be carried out easily for shorter time.

The separator for a fuel cell obtained is provided with excellent hydrophilicity regardless of the passage of time without subjecting it to specific pre-treatment and can enhance the characteristic of the cell.

Figure 7:
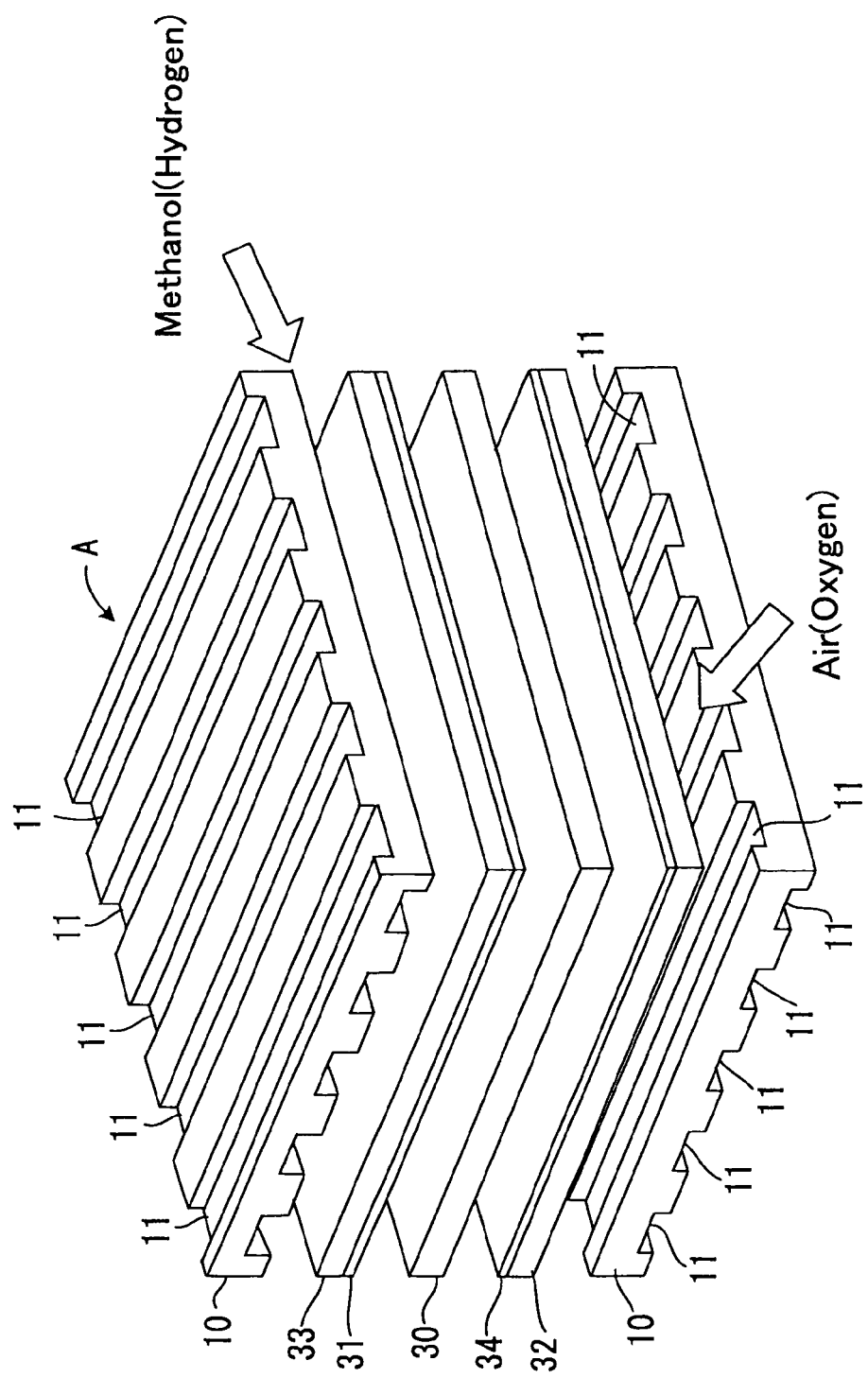
FIG. 7 is an outline exploded perspective drawing showing one example of a fuel cell in which the separator of the present invention for a fuel cell is assembled.

The separator of the present invention for a fuel cell thus constituted is provided with excellent hydrophilicity regardless of the passage of time without subjecting it to specific pre-treatment and is controlled in flow passage resistance to a low level, and therefore it becomes possible to readily remove water produced in electrode reaction of the cell and to inhibit the characteristics of the fuel cell from being fluctuated. In a polymer electrolyte fuel cell A prepared by using the above separator shown in, for example, FIG. 7, to be specific, a fuel cell A in which MEA is constituted by a polymer electrolyte membrane (a proton conductive membrane) 30 and a fuel electrode 33 and an air electrode 34 each of which is provided at both sides of the electrolyte membrane and has catalyst layers 31, 32 and in which both sides of MEA are interposed by the separators 10, 10 of the present invention to laminate a single cell stack, the separator 10 for a fuel cell having the excellent effects described above is used, and therefore obtained is a fuel cell which has a stable power generation efficiency over a long period of time and which is excellent in cell characteristics.

EXAMPLES

Next, the present invention shall be explained in further details with reference to examples and comparative examples, but the present invention shall not be restricted to the examples described below.

Examples 1 to 5 and Comparative Examples 1 to 7

The respective separators for a fuel cell were obtained by preparing methods and treating methods each described below.

Example 1 p-Toluenesulfonic acid 1.5 part by weight as a curing accelerator was added to a furan resin (Hitafuran VF-303, manufactured by Hitachi Chemical Co., Ltd.) 90 parts by weight and natural flake graphite (average diameter: 5 µm, manufactured by Nippon Graphite Industries, Ltd.) 10 parts by weight, and they were mixed and stirred at 3000 rpm for 2 minutes to prepare a mixture. A suited amount of the mixture was poured into a mold for molding a plate having an inner dimension of 59 mm×59 mm×1.5 mm, and the mold was heated to 100° C. and subjected to solidification treatment. Then, the resin plate prepared was released from the mold and subjected to heat treatment of 1500° C. in a calcining furnace to obtain a carbon-made separator.

The separator thus obtained had a dimension of 47 mm×47 mm×1.2 mm (a width of the flow passage surface: 1 mm and a depth thereof: 0.5 mm). The separator obtained by the heat treatment method was used as well in Example 2 and Comparative Examples 1 to 7 each described later.

The flow passage surface of the separator thus obtained was subjected to laser treatment at room temperature in an air atmosphere under the conditions of an output power of 12 W and a pulse duration of 50 µs by means of a YAG laser apparatus to form a hydrophilic functional group and an uneven part.

Example 2

The flow passage surface of the separator obtained by the same method as in Examples 1 described above was subjected to laser irradiation treatment at room temperature in an air atmosphere under the conditions of an output power of 10 W and continuous scanning by means of a YAG laser apparatus to form a hydrophilic functional group and an uneven part.

Example 3 p-Toluenesulfonic acid 1.5 part by weight as a curing accelerator was added to the furan resin (Hitafuran VF-303, manufactured by Hitachi Chemical Co., Ltd.) 100 parts by weight, and they were mixed and stirred to prepare a mixture. The mixture was poured into a prescribed mold, and the mold was heated to 100° C. and subjected to solidification treatment. Then, the resin plate prepared was released from the mold and subjected to heat treatment of 1500° C. in a calcining furnace to obtain a carbon-made separator.

The separator thus obtained had a dimension of 47 mm×47 mm×1.2 mm (a width of the flow passage surface: 1 mm and a depth thereof: 0.5 mm).

The flow passage surface of the separator obtained was subjected to laser treatment at room temperature in an air atmosphere under the conditions of an output power of 12 W and a pulse duration of 50 µs by means of a YAG laser apparatus to form a hydrophilic functional group and an uneven part.

Example 4

Natural flake graphite (average diameter: 5 µm, manufactured by Nippon Graphite Industries, Ltd.) 50 parts by weight was added to a mixed resin of the furan resin (Hitafuran VF-303, manufactured by Hitachi Chemical Co., Ltd.) 10 parts by weight and a polyvinyl chloride-polyvinyl acetate copolymer (ZEST-C150S, manufactured by Shin Dai-Ichi Vinyl Corporation) 40 parts by weight, and further diallyl phthalate 20 parts by weight was added to the above mixture as a plasticizer. The resultant mixture was blended and dispersed by means of a Henschel mixer and sufficiently kneaded by means of two rolls to prepare a composition for a separator for a fuel cell. Further, it was crushed and sieved to obtain powder.

The powder thus obtained was press-molded by using a mold having a prescribed groove pattern, and then the molded article was dried and solidified at a temperature of 300° C. in an oxygen gas-containing atmosphere and subjected to heat treatment of 1500° C. in an inert gas atmosphere to obtain a carbon-made separator.

The separator thus obtained had a dimension of 47 mm×47 mm×1.2 mm (a width of the flow passage surface: 1 mm and a depth thereof: 0.5 mm).

The flow passage surface of the separator obtained was subjected to laser treatment at room temperature in an air atmosphere under the conditions of an output power of 12 W and a pulse duration of 50 µs by means of a YAG laser apparatus to form a hydrophilic functional group and an uneven part.

Example 5

A phenol resin (PL4805N, manufactured by Gunei Chemical Industry Co., Ltd.) 25 parts by weight and natural flake graphite (average diameter: 5 µm, manufactured by Nippon Graphite Industries, Ltd.) 75 parts by weight were mixed by means of a Henschel mixer to prepare a composition for a separator for a fuel cell.

The composition thus obtained was press-molded by using a prescribed mold to obtain a separator of a resin/graphite composite.

The separator thus obtained had a dimension of 47 mm×47 mm×1.2 mm (a width of the flow passage surface: 1 mm and a depth thereof: 0.5 mm).

The flow passage surface of the separator obtained was subjected to laser treatment at room temperature in an air atmosphere under the conditions of an output power of 8 W and a pulse duration of 50 μs by means of a YAG laser apparatus to form a hydrophilic functional group and an uneven part.

Comparative Example 1

A flow passage surface of a separator obtained by the same method as in Examples 1 described above was subjected to laser treatment at room temperature in an air atmosphere under the conditions of an output power of 1 W and continuous scanning by means of a YAG laser apparatus.

Comparative Example 2

A separator obtained by the same method as in Examples 1 described above was used to carry out oxygen plasma treatment under the conditions of an output power of 50 W and an irradiation time of one minute.

Comparative Example 3

A separator obtained by the same method as in Examples 1 described above was used to carry out oxygen plasma treatment under the conditions of an output power of 300 W and an irradiation time of 30 minutes.

Comparative Example 4

A separator obtained by the same method as in Examples 1 described above was used in a non-treated state.

Comparative Example 5

A separator obtained by the same method as in Examples 1 described above was subjected to sand blast treatment (particle diameter of a sand blast agent: 1 μm, shot pressure: 1 kg).

Comparative Example 6

A flow passage surface of a separator obtained by the same method as in Examples 1 described above was subjected to laser treatment at room temperature in an air atmosphere under the conditions of an output power of 200 W and continuous scanning by means of a YAG laser apparatus.

Comparative Example 7

A separator obtained by the same method as in Examples 1 described above was not subjected to laser irradiation treatment and subjected to oxidation treatment in an air atmosphere under the condition of 500° C. for 20 minutes.

The respective separators for a fuel cell obtained in Examples 1 to 5 and Comparative Examples 1 to 6 described above were used to evaluate hydrophilicity (presence of a hydrophilic functional group, an average roughness Ra, a contact angle immediately after the treatment and hydrophilicity with the passage of time) by the following respective evaluation methods. The results thereof are shown in the following Table 1.

Evaluation Method of the Presence of a Hydrophilic Functional Group:

A hydrophilic functional group on the surface of the separator was evaluated on the basis of the following evaluation criteria by means of an X-ray photoelectron spectroscopic analyzer (ESCA-3400) manufactured by Shimadzu Corporation.

Evaluation Criteria:

⊚: bonding energy peaks of C—O and C═C are observed to grow as compared with non-treatment state (Comparative Example 4); bonding of a carboxyl group (COOH) is newly produced; and a bonding energy peak of oxygen is observed to grow.

○: bonding energy peaks of C—O and C═C are observed to grow as compared with non-treatment state (Comparative Example 4), and a bonding energy peak of oxygen is observed to grow.

Δ: a little change in bonding energy is observed but scarcely different.

X: a peak attributed to a functional group is not observed to grow as compared with non-treatment state (Comparative Example 4), and a peak of a bonding energy attributed to oxygen described above is not observed as well to be changed.

Figure 8:
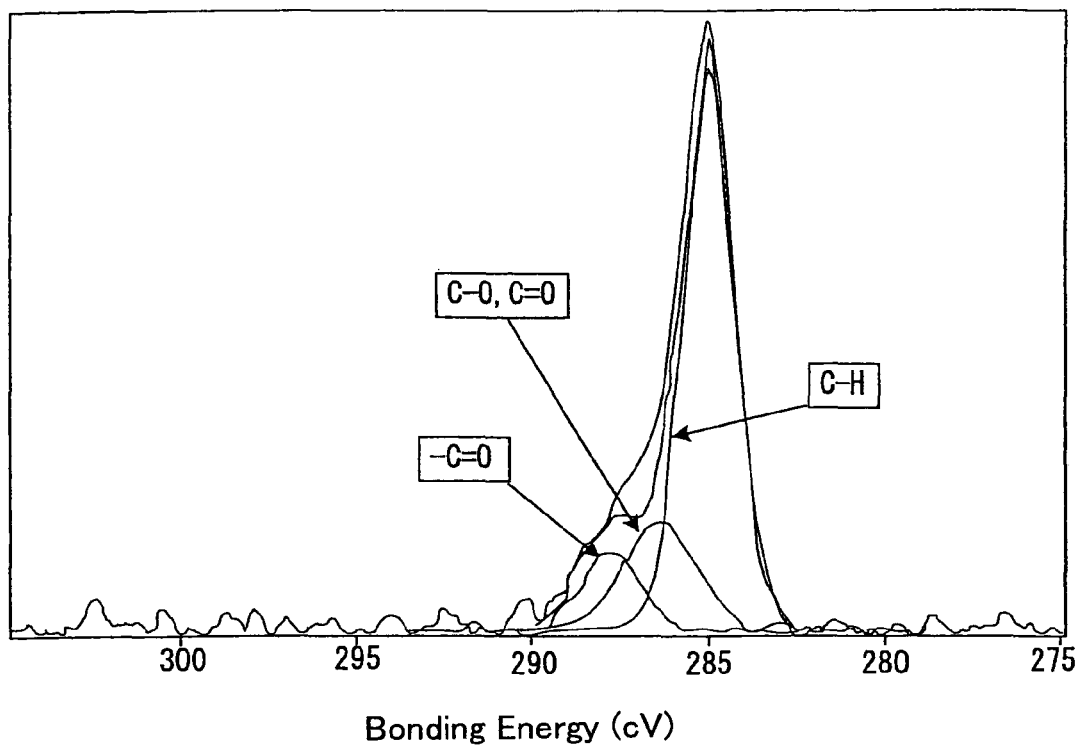
FIG. 8 is a diagram showing one example in which a hydrophilic functional group is evaluated.
Figure 9:
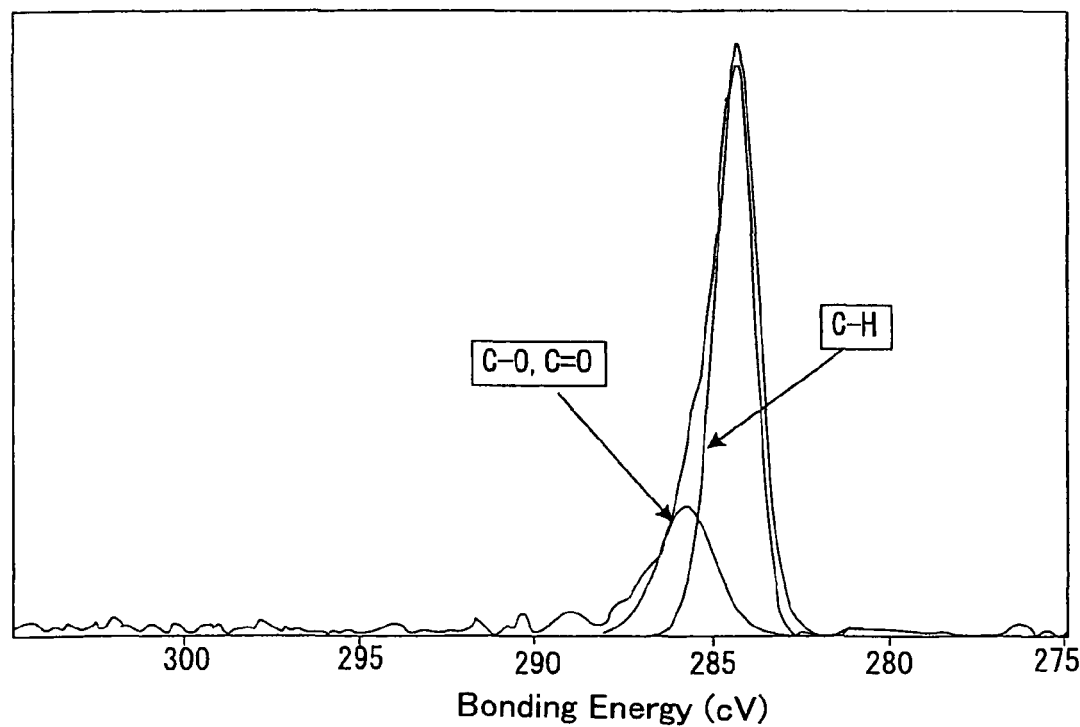
FIG. 9 is a diagram showing another example in which a hydrophilic functional group is evaluated.

The results of evaluations carried out by the X-ray photoelectron spectroscope analyzer (ESCA) are exemplified in FIG. 8 and FIG. 9, wherein FIG. 8 shows the peaks of —C═O, C—O.C═O and C—H, and FIG. 9 shows the peaks of C—O.C═O and C—H.

Evaluation Method of Average Roughness Ra:

The average surface roughness Ra (μm) was evaluated at an operating speed of 0.3 mm/minute by means of an average surface roughness contour measuring instrument Surfcom manufactured by Tokyo Seimitsu Co., Ltd.

Evaluation Method of Contact Angle:

The contact angle after the treatment was evaluated by allowing 1 μl of a droplet to fall and measuring a contact angle by means of a contact angle meter CA-X type manufactured by Kyowa Interface Science Co., Ltd. It is shown that the lower the numerical value is, the better the hydrophilicity is.

Evaluation Method of Hydrophilicity with the Passage of Time:

The hydrophilicity with the passage of time was evaluated by a change in the contact angle, wherein the separator was stored under the atmosphere of 25° C. and 60% and under the atmosphere of 60° C. and dry for certain periods (7 days, 2 months), and the contact angle was measured by the same method as described above. It is shown that the lower the change of the numerical value is, the better the hydrophilicity with the passage of time is.

TABLE 1

|  | Example | | | | | Comparative Example | | | | | | |
| --- | --- | --- | --- | --- | --- | --- | --- | --- | --- | --- | --- | --- |
|  | 1 | 2 | 3 | 4 | 5 | 1 | 2 | 3 | 4 | 5 | 6 | 7 |
| Hydrophilic functional group | ◎ | ◎ | ○ | ◎ | ◎ | X | Δ | X | X | X | Δ | Δ |
| Average roughness Ra (μm) | 1.1 | 0.7 | 2.5 | 1.3 | 5.4 | 0.2 | 0.2 | 0.9 | 0.5 | 4.1 | 500 | 0.9 |
| Contact angle immediately after treatment | 0 | 0 | 0 | 0 | 0 | 100 | 20 | 100 | 100 | 65 | — | 60 |
| Aging at 25° C. for 7 days | 0 | 0 | 0 | 0 | 0 | 100 | 55 | 100 | 100 | 100 | — | 60 |
| Aging at 25° C. for 2 months | 0 | 0 | 0 | 0 | 0 | 100 | 100 | 100 | 100 | 100 | — | 80 |
| Aging at 60° C. for 2 months | 0 | 0 | 0 | 0 | 0 | 100 | 100 | 100 | 100 | 100 | — | 100 |

The expression of "-" in Comparative Example 6 shows incapable of measurement.

As apparent from the results summarized in Table 1 described above, it was found that the separators for a fuel cell in which the hydrophilic functional groups were formed in Examples 1 to 5 falling in the scope of the present invention and in which uneven parts having an average surface roughness Ra of less than 50 μm were formed were endowed with excellent hydrophilicity and had stable hydrophilicity regardless of the passage of time as compared with the separator for a fuel cell prepared in Comparative Example 1, the separators for a fuel cell prepared in Comparative Examples 2 and 3 which were subjected to oxygen plasma treatment, the separator for a fuel cell prepared in Comparative Example 4 which was subjected to no treatment, the separator for a fuel cell prepared in Comparative Example 5 which was subjected to sand blast treatment and the separator for a fuel cell prepared in Comparative Example 7 which was subjected to oxidation treatment each of which falls outside the scope of the present invention.

Also, in Comparative Example 6, the dimensional accuracy was inferior, and the grooves were too deeply formed. The surface roughness was too large, and a part thereof was cut off. Accordingly, it was found that the above method was unsuitable as a processing method for a small-sized separator for a fuel cell.

Further, the separators for a fuel cell which were subjected to laser irradiation treatment in Examples 1 to 5 falling in the scope of the present invention were observed under an electron microscope (magnification: 10,000 times) to find that they had continuous and smooth curved surfaces as was the case with in FIG. 3. In contrast with this, it was found that in Comparative Examples 1 and 4, curved surfaces stayed in a discontinuous state as was the case with in FIG. 4; in Comparative Examples 2 and 5 to 7, curved surfaces stayed in more discontinuous state as was the case with in FIG. 5; and in Comparative Example 3, a curved surface stayed in a discontinuous state as shown in FIG. 6.

INDUSTRIAL APPLICABILITY

A separator for a fuel cell which is suited to polymer electrolyte fuel cells and a production process for the same are obtained.

What is claimed is:

1. A production process of a separator for a fuel cell comprising:
   forming and increasing a hydrophilic functional group on a part or the whole part of a flow passage surface of the separator for a fuel cell molded from at least a carbon material and,
   forming an uneven part having an average surface roughness Ra of more than 0.2 μm and less than 50 μm on a part or the whole part of the flow passage surface,
   by subjecting said part of the flow passage surface of the separator to laser irradiation treatment at an output power of 3 to 15 W in gas atmosphere containing at least oxygen.

2. The production process of the separator for a fuel cell as described in claim 1, wherein the carbon material comprises any one of an expanded graphite, a vitreous carbon and a composite material of vitreous carbon and graphite.

3. The production process of the separator for a fuel cell as described in claim 1, wherein the hydrophilic functional group is at least one of —OH, —COOH and >C=O.

4. The production process of the separator for a fuel cell as described in claim 2, wherein the hydrophilic functional group is at least one of —OH, —COOH and >C=O.

5. The production process of the separator for a fuel cell as described in claim 1, wherein the uneven part has an average surface roughness Ra of more than 0.2 μm and less than 30 μm.

6. The production process of the separator for a fuel cell as described in claim 2, wherein the uneven part has an average surface roughness Ra of more than 0.2 μm and less than 30 μm.

7. The production process of the separator for a fuel cell as described in claim 3, wherein the uneven part has an average surface roughness Ra of more than 0.2 μm and less than 30 μm.

8. A separator for a fuel cell comprising any one of carbon materials selected from the group consisting of at least an expanded graphite, a vitreous carbon and a composite material of vitreous carbon and graphite, wherein a hydrophilic functional group is formed and increased, and an uneven part having an average surface roughness Ra of more than 0.2 μm and less than 50 μm is formed on a part or the whole part of a flow passage surface of the separator by laser irradiation treatment at an output power of 3 to 15 W in gas atmosphere containing at least oxygen.

9. The separator for a fuel cell as described in claim 8, wherein the hydrophilic functional group is at least one of —OH, —COON and >C=O.

10. The separator for a fuel cell as described in claim 8, wherein the uneven part has an average surface roughness Ra of more than 0.2 μm and less than 30 μm.

11. The separator for a fuel cell as described in claim 9, wherein the uneven part has an average surface roughness Ra of more than 0.2 μm and less than 30 μm.

12. The separator for a fuel cell as described in claim 8, wherein the uneven part has an average surface roughness Ra of more than 0.2 μm and less than 10 μm.

13. The separator for a fuel cell as described in claim 9, wherein the uneven part has an average surface roughness Ra of more than 0.2 μm and less than 10 μm.

* * * * *